United States Patent
Buchheim et al.

(10) Patent No.: US 8,923,527 B2
(45) Date of Patent: Dec. 30, 2014

(54) COMPACT WIRELESS MICROPHONE

(75) Inventors: James Buchheim, Davie, FL (US); Jack DeBiasio, Oxnard, CA (US)

(73) Assignee: Scosche Industries, Inc., Oxnard, CA (US)

( * ) Notice: Subject to any disclaimer, the term of this patent is extended or adjusted under 35 U.S.C. 154(b) by 619 days.

(21) Appl. No.: 12/872,948

(22) Filed: Aug. 31, 2010

(65) Prior Publication Data
US 2011/0075876 A1 Mar. 31, 2011

Related U.S. Application Data

(60) Provisional application No. 61/238,766, filed on Sep. 1, 2009.

(51) Int. Cl.
| H04B 1/00 | (2006.01) |
| H04M 1/60 | (2006.01) |
| H04M 1/04 | (2006.01) |
| B60R 11/02 | (2006.01) |
| B60R 11/00 | (2006.01) |

(52) U.S. Cl.
CPC .............. *H04M 1/6075* (2013.01); *H04M 1/04* (2013.01); *B60R 11/0247* (2013.01); *H04M 1/6091* (2013.01); *B60R 2011/0061* (2013.01)
USPC .............................................. 381/86; 381/92

(58) Field of Classification Search
CPC ... H04M 1/6091; H04M 1/04; H04M 1/6075; H04M 2250/02
USPC ............. 381/86, 322, 1, 2, 92, 365, 355, 311, 381/309, 122, 128, 77, 300, 302; 455/41.2, 455/41.3, 3.05, 3.06, 556.1, 569.2, 73, 455/550.1; 379/428.01, 430
See application file for complete search history.

(56) References Cited

U.S. PATENT DOCUMENTS

| 4,109,988 | A  | * | 8/1978  | Olson ........................... 439/265 |
| 6,626,704 | B1 | * | 9/2003  | Pikel ............................ 439/638 |
| 6,778,814 | B2 |   | 8/2004  | Koike |
| 7,187,948 | B2 | * | 3/2007  | Alden .......................... 455/557 |
| 7,306,347 | B2 |   | 12/2007 | Selover |
| 7,756,550 | B2 | * | 7/2010  | Piekarz ..................... 455/569.1 |
| 2004/0198436 | A1 |   | 10/2004 | Alden |
| 2005/0026560 | A1 | * | 2/2005  | Villaverde et al. ........... 455/3.06 |
| 2006/0178028 | A1 |   | 8/2006  | Swiatek et al. |
| 2006/0229110 | A1 |   | 10/2006 | Tsai |
| 2007/0015537 | A1 | * | 1/2007  | DeBiasio et al. .......... 455/556.1 |

OTHER PUBLICATIONS

ESSR dated Aug. 13, 2013, Application No. 10814377.7 for PCT/US2010047385. European Patent Office of the Netherlands.

* cited by examiner

*Primary Examiner* — Lun-See Lao
(74) *Attorney, Agent, or Firm* — Arent Fox LLP

(57) ABSTRACT

A wireless microphone for vehicles includes a housing, an audio plug extending from one end of the housing, a wireless transmitter within the housing, a transducer within the housing, the transducer being electrically connected to the transmitter, and a wireless receiver within the housing, the receiver being electrically connected to the plug, wherein the plug is configured to plug into an auxiliary input on a vehicle audio unit and thereby mechanically support the microphone.

38 Claims, 8 Drawing Sheets

COMPACT WIRELESS MICROPHONE

CROSS REFERENCE TO RELATED APPLICATIONS

This application claims priority to provisional application, Ser. No. 61/238,766, entitled "BLUETOOTH MICROPHONE," filed Sep. 1, 2009, the entire disclosure of which is incorporated herein by reference.

BACKGROUND

1. Field

The present disclosure relates generally to microphones, and more particularly, to wireless microphones for automobiles.

2. Introduction

Communication devices, such as two-way radios, mobile telephones, and the like, are often used in automobiles to enable the driver to communicate with various people at stationary locations and in other vehicles. Although these devices are quite convenient, they have significant drawbacks. The driver is often required to steer the vehicle with one hand and operate the device with the other. This can be distracting and lead to inattentive driver behavior. Thus, it is preferable for these communication devices to operate hands-free, such that the driver does not need to hold the device while talking.

Various systems have been implemented or proposed in the literature to provide hands-free operation. These systems include a microphone and an audio speaker coupled to the communications device. The microphone is typically mounted in the vehicle somewhere in the vicinity of the driver and the audio speaker is generally positioned remote from the microphone to assist in minimizing feedback from the audio speaker to the microphone. By way of example, it is not uncommon to use Bi-directional communication systems include an audio speaker and a microphone. In order to improve hands-free performance in a vehicle communication system, a microphone is typically mounted near the driver's head. For example, a microphone is commonly attached to the vehicle visor or headliner using a fastener such as a clip, adhesive, hook-and-loop fastening tape (such as VELCRO® brand fastener), or the like. The audio speaker associated with the communication system is preferably positioned remote from the microphone to assist in minimizing feedback from the audio speaker to the microphone. It is common, for example, for the audio speaker to be located in a vehicle adaptor, such as a hang-up cup or a cigarette lighter plug used to provide energizing power from the vehicle electrical system to the communication device. Thus, although the communication system designer knows the position of the audio speaker in advance, the position of the microphone is unknown as the user can position the microphone where they choose. The position of the microphone relative to the person speaking will determine the level of the speech signal output by the microphone and may affect the signal-to-noise ratio. The position of the microphone relative to the audio speaker will impact feedback between the speaker and microphone. Accordingly, the performance of the audio system is subject to the user's installation of the microphone. Additionally, the microphone will typically include a wire, which if it is mounted to the surface of the vehicle interior, will not be aesthetically pleasing. Alternatively, if the wire is to be mounted behind the interior lining, the vehicle interior must be disassembled and then reattached so that the wire can be hidden, which may result in parts that rattle loudly or hang loosely from the vehicle frame.

SUMMARY

In one aspect of the disclosure, a wireless microphone for vehicles includes a housing, an audio plug extending from one end of the housing, wireless transmitter within the housing, a transducer within the housing, the transducer being electrically connected to the transmitter, and a wireless receiver within the housing, the receiver being electrically connected to the plug, wherein the plug is configured to plug into an auxiliary input on a vehicle audio unit and thereby mechanically support the microphone.

In another aspect of the disclosure, a wireless microphone system for vehicles includes an audio adapter having first and second audio jacks and a first audio plug configured to plug into an auxiliary input on a vehicle audio unit and thereby mechanically support the switch, the first plug having a switchable electrical connection between the first and second jacks, and a wireless microphone including housing, a second audio plug extending from one end of the housing, a wireless transmitter within the housing, a transducer within the housing, the transducer being electrically coupled to the transmitter, and a wireless receiver within the housing, the receiver being electrically coupled to the second plug, wherein the second plug is configured to plug into the first jack and thereby mechanically support the microphone.

In yet another aspect of the disclosure, an audio adapter for vehicles includes first and second audio jacks, the first jack being configured to receive an a first audio plug for an audio component, and a second audio plug configured to plug into an auxiliary input on a vehicle audio unit and thereby mechanically support the switch and the audio component, the second plug having a switchable electrical connection between the first and second jacks that is controllable by the audio component.

In a further aspect of the disclosure, an audio connector for vehicles includes an audio jack configured to receive a first audio plug for an audio component and thereby support the audio component, a first audio plug, and an audio cable electrically connecting the jack and first plug, wherein the jack is configured to be mounted in the interior of the vehicle and accessible to a user, and wherein the cable is configured to enable the first plug to plug into an auxiliary input on the rear of a vehicle audio unit.

In yet a further aspect of the disclosure, a wireless microphone system for vehicles including an audio connector having an audio jack, a first audio plug, and an audio cable electrically connecting the jack and first plug, wherein the jack is mounted in the interior of the vehicle and accessible to a user, and wherein the cable enables the first plug to plug into an auxiliary input on a vehicle's audio unit, and wireless microphone including a housing, a second audio plug extending from one end of the housing, a wireless transmitter within the housing, a transducer within the housing, the transducer being electrically coupled to the transmitter, and a wireless receiver within the housing, the receiver being electrically coupled to the second plug, wherein the second plug is plugged into the jack, thereby mechanically supporting the microphone.

It is understood that other aspects of the present invention will become readily apparent to those skilled in the art from the following detailed description, wherein it is shown and described only exemplary configurations of server applications operating in various web based environments. As will be realized, the present invention includes other and different aspects of server applications and its several details are capable of modification in various other respects, all without departing from the spirit and scope of the present invention. Accordingly, the drawings and the detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention. The invention, however, may be embodied in many different forms and should not be construed as limited to the various concepts presented throughout this disclosure. Rather, these concepts are provided so that this disclosure will be thorough and complete, and will fully convey the scope of the present invention to those skilled in the art. The detailed description includes specific details for the purpose of providing a thorough understanding of the invention. However, it will be apparent to those skilled in the art that the invention may be practiced without these specific details. In some instances, well-known structures and components are omitted in order to avoid obscuring the concepts of the invention.

Various aspects of the present invention will be presented with reference to several exemplary embodiments. The term "exemplary" used throughout this disclosure means "serving as an example, instance, or illustration," and should not necessarily be construed as preferred or advantageous over other disclosed embodiments. The details of these exemplary embodiments may be described with various systems elements (e.g., systems, apparatus, methods, processes, devices, units, modules, parts, blocks, circuits, components, and/or the like). It will be understood that when any element is referred to as being "connected" to another element, whether electrically or mechanically, it can be directly connected to the other element or intervening elements may also be present.

Various concepts will now be presented with reference to an exemplary wireless microphone. The wireless microphone is well suited for use in vehicles, such as automobiles, motorcycles, trains, boats, aircraft, and the like, but may also be used for other non-vehicle applications. By way of example, the wireless microphone may be used with a home stereo or entertainment system. Although presented with reference to a wireless microphone, those skilled in the art will readily appreciate that the various concepts presented throughout this disclosure may be extended to other audio devices. Accordingly, any reference to a wireless microphone for a specific application is intended only to illustrate various aspects of the present invention, with the understanding that these aspects have a wide range of embodiments and applications.

Figure 1:
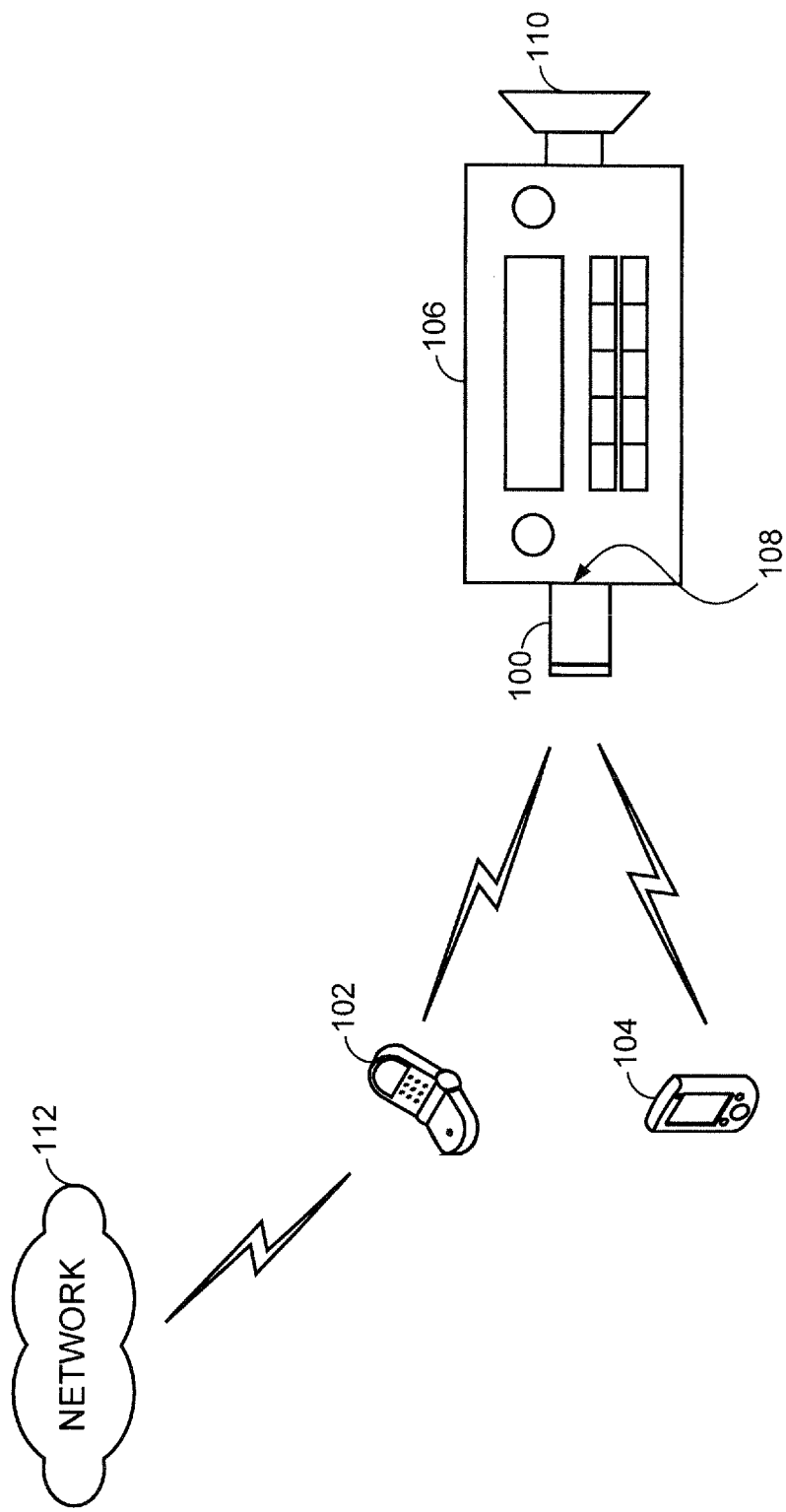
FIG. 1 is a conceptual diagram illustrating an example of a wireless communications environment.

An exemplary embodiment of the present invention will now be presented with reference to FIG. 1. In this embodiment, a wireless microphone 100 may be used in a vehicle to provide both hands free operation of a mobile telephone 102 (e.g., mobile telephone, smart telephone, PDA, etc.) and audio streaming from a digital audio player 104 (e.g., MP3 player, WMA player, smart phone, PDA, etc.). This wireless microphone 100 may be connected to the vehicle's audio system through an auxiliary input jack 108 typically resident on either the head unit 106 or in the dash, thereby converting the input jack 108 into a wireless microphone without any other installation. When streaming audio, the wireless microphone receives wireless transmissions from the digital audio player 104 and provides the content from the received transmissions to the speakers 110 of the vehicle's audio system through the auxiliary input jack 108 on the head unit 106. When the occupant of the vehicle (near end caller) is operating the mobile telephone 102, the wireless microphone 100 picks up the near end participant's voice and transmits the voice over the wireless medium to the mobile telephone 102, which in turn, provides the voice to a far end participant over a network 112 (e.g., a cellular network). When the voice of the far end participant is received at the mobile telephone 102, the voice is transmitted over the wireless medium to the wireless microphone 100, where it is provided to the speakers 110 through the auxiliary input jack 108. Preferably, the wireless microphone 100 mutes the audio from the digital audio player 104 when the near end participant is operating the mobile telephone 102.

The wireless standard employed by the wireless microphone 100 may be implemented with any suitable short range wireless protocol currently available or later developed. Preferably, the wireless protocol selected for any particular application is one that is minimally susceptible to electrical interference, and provides both a high dynamic range and high signal-to-noise ratio to maintain the integrity of the wireless communications. Examples include Bluetooth™, Ultra-Wideband (UWB), and IEEE 802.11 to name a few.

Figure 2:
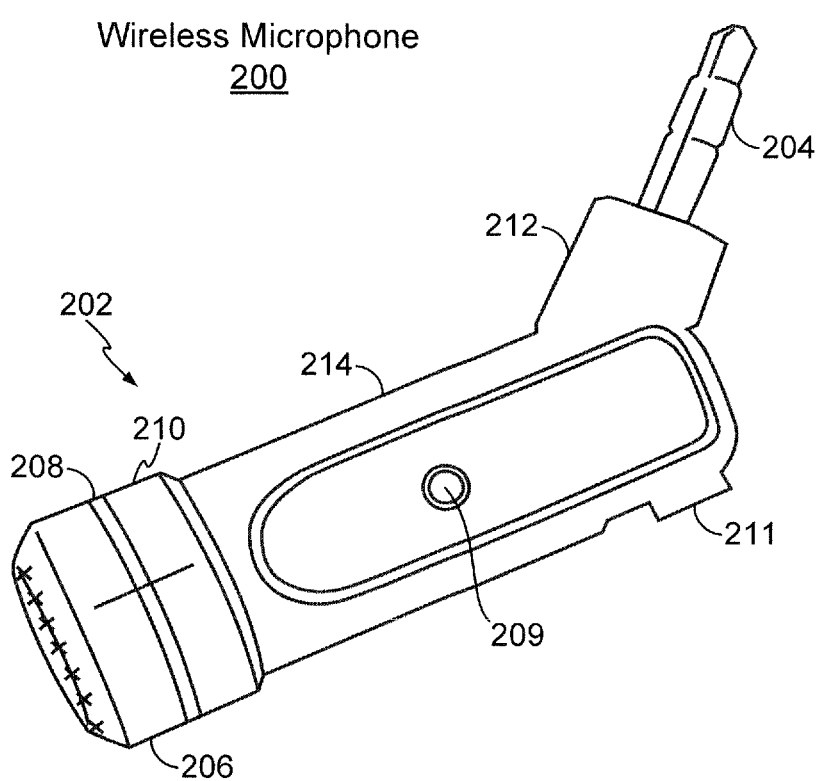
FIG. 2 is a perspective view illustrating an example of a wireless microphone.

An exemplary embodiment of a wireless microphone will now be presented with reference to FIG. 2. The wireless microphone 200 preferably has a rigid and lightweight design, such that once it is plugged into the auxiliary input jack of the vehicle's audio system, it supports the entire wireless microphone 200. The wireless microphone 100 may include a housing 202, an audio plug 204 extending from one end of the housing 202, a microphone cover 206 connected to the other end of the housing 202, a light diffuser 208 positioned between the housing 202 and the microphone cover 206, a control button 209, and a charging connector 211. The audio plug 204 may a 3.5 mm audio plug to interface to a standard 3.5 mm audio jack on the head unit of a vehicle's audio system. Other examples of audio plugs include a ⅛ inch stereo mini plug or an RCA plug to interface to different types of audio plugs on different head units. The light diffuser 208 may be used to provide an indication to the occupant of the vehicle that the wireless microphone 200 is operational. The control button 209 may be used to allow the occupant to control the wireless microphone 200. By way of example, the occupant may use the button to answer or terminate a call on the mobile telephone. As will be described in greater later, the housing 202 contains various electronics, which together with an audio transducer (not shown) positioned under the microphone cover 206 implements the functionality of the wireless microphone described above in connection with FIG. 1. The electronics may include a rechargeable battery that can be recharged through the charging connector 211. The charging connector 211 may be a two-pin connector configured to receive a cable (not shown) that has a USB connection at the other end. In this configuration, the wireless microphone 200 may be recharged by plugging the USB connection of the cable into a computer, wall charger, car charger, or other suitable source of power with a USB connection.

Figure 3:
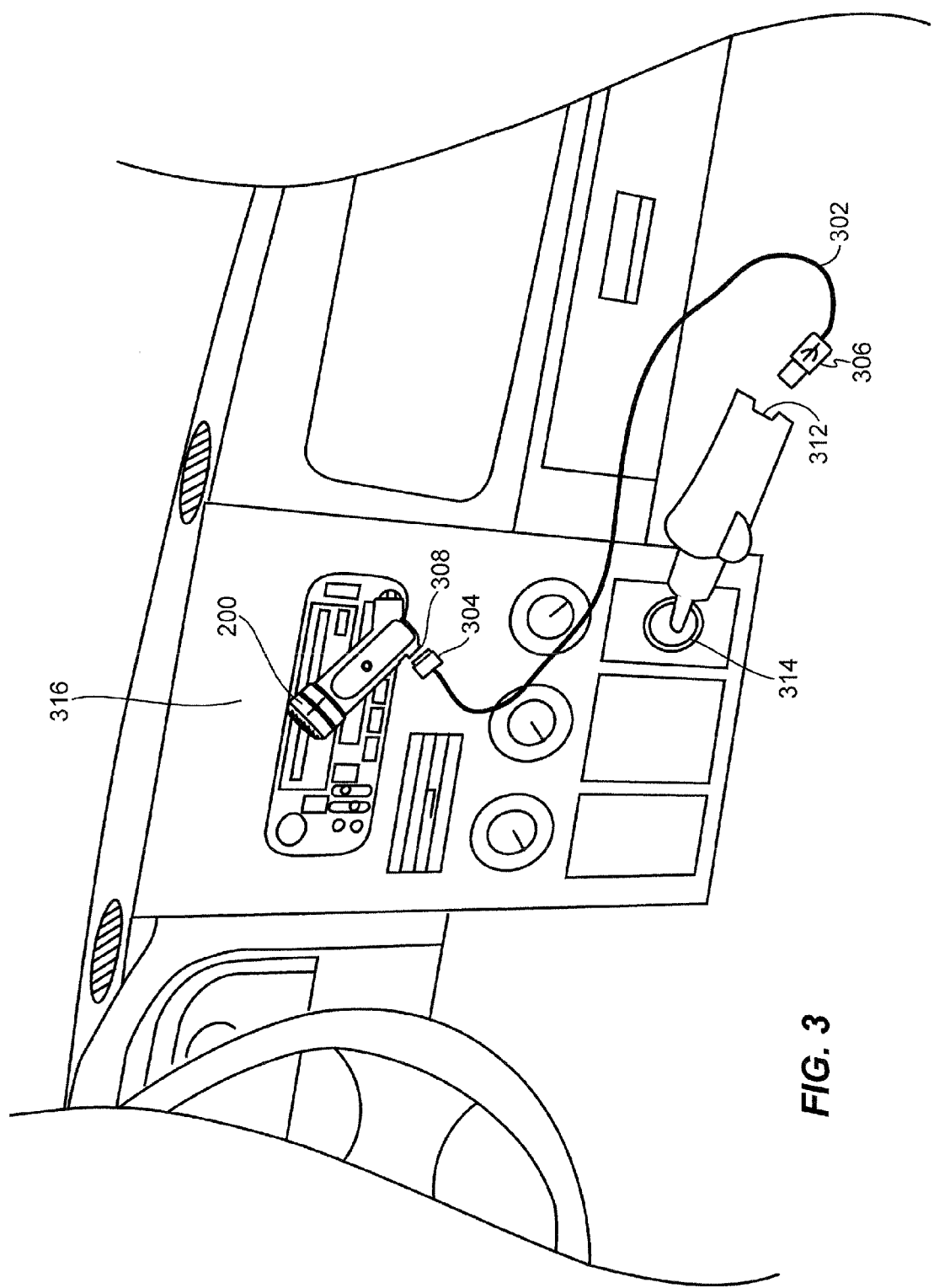
FIG. 3 is a perspective view illustrating an example of a battery charger to charge a wireless microphone.

An example of using a car charger to charge the wireless microphone during operation is shown in FIG. 3. In this example, the cable 302 is a two-pin to USB cable with a two-pin connector 304 at one end and a USB connector 306 at the other end. The two-pin connector 304 at the one end of the cable 302 is connected to the two-pin connector 308 on the wireless microphone 300, and the USB connector 306 at the other end of the cable 302 is connected to a USB connector 310 on a car charger 312. The car charger 312 is shown as a lighter plug that plugs into the lighter socket 314 on the vehicle's dash 316. The lighter plug converts 12V from the car battery to 5V for charging the wireless microphone 300.

Returning to FIG. 2, the housing 202 may be a tubular member formed with a hard elastomeric, such thermoplastic polyurethane (TPU), or some other suitable material. The tubular member is show with a substantially cylindrical shape, but may have other shapes depending upon the particular design preferences of the skilled artisan. The tubular member is formed with a head portion 210 connected to the microphone cover 206, a tail portion 212 supporting the plug 204, and an elongated body portion 214 extending between the head portion 210 and the tail portion 212. The tail portion 212 extends from the body portion 214 at an obtuse angle relative to the body portion's axis so the audio transducer (not shown) below the microphone cover 206 may be directed upward towards the occupant of the vehicle when the wireless microphone 200 is plugged into the auxiliary input of the vehicle's audio system. With the transducer directed upward towards the occupant, the wireless microphone 200 may be better equipped to pick up the occupant' voice in what can be a noisy vehicle environment. The microphone cover 206 and the head portion 210 of the housing 202 may be designed with the same cross-section area, or diameter in the case of a cylindrically shaped tubular member, to secure the light diffuser 208 between the two. The elongated body portion 214 of the housing 202 may have a smaller cross-section area (or diameter) than the head portion 210 to provide a more compact design. The cross-section area (or diameter) of the tail portion 212 of the housing 202 is further reduced to better support the audio plug 204, and thereby reduce the mechanical stress on the body 202 when the audio plug 204 is supporting the wireless microphone 200 via its connection to the auxiliary input jack of the vehicle's audio system. The tail portion 212 may be designed with a central hub to reinforce the audio plug 204, which tends to further reduce the mechanical stress on the body 202. In one exemplary embodiment, the cross-section area of the head portion 210 is less than 20.0 mm, the cross-section area of the body portion 214 is less than 18.0 mm, the cross-section area of the tail portion 212 is less than 12.0 mm, and the distance between the end of the microphone cover 206 and the end of the audio plug 204 is less than 7.0 cm. This configuration results in a rigid and lightweight design that can house the electronics and audio transducer to provide a fully self-contained device, while at the same time, providing a device that can support itself when plugged into the audio input jack of the vehicle's audio system. This device may be easily carried by a person for use in different vehicle, or non-vehicle, applications.

As those skilled in the art will readily appreciate, the wireless microphone described in connection with FIG. 2 is merely an exemplary embodiment of the present invention. Based on the teaching presented throughout this disclosure, the skilled artisan will be able to design various embodiments of a wireless microphone having different materials, shapes, and dimensions, while providing a rigid, lightweight, compact, self-contained wireless microphone.

Figure 4:
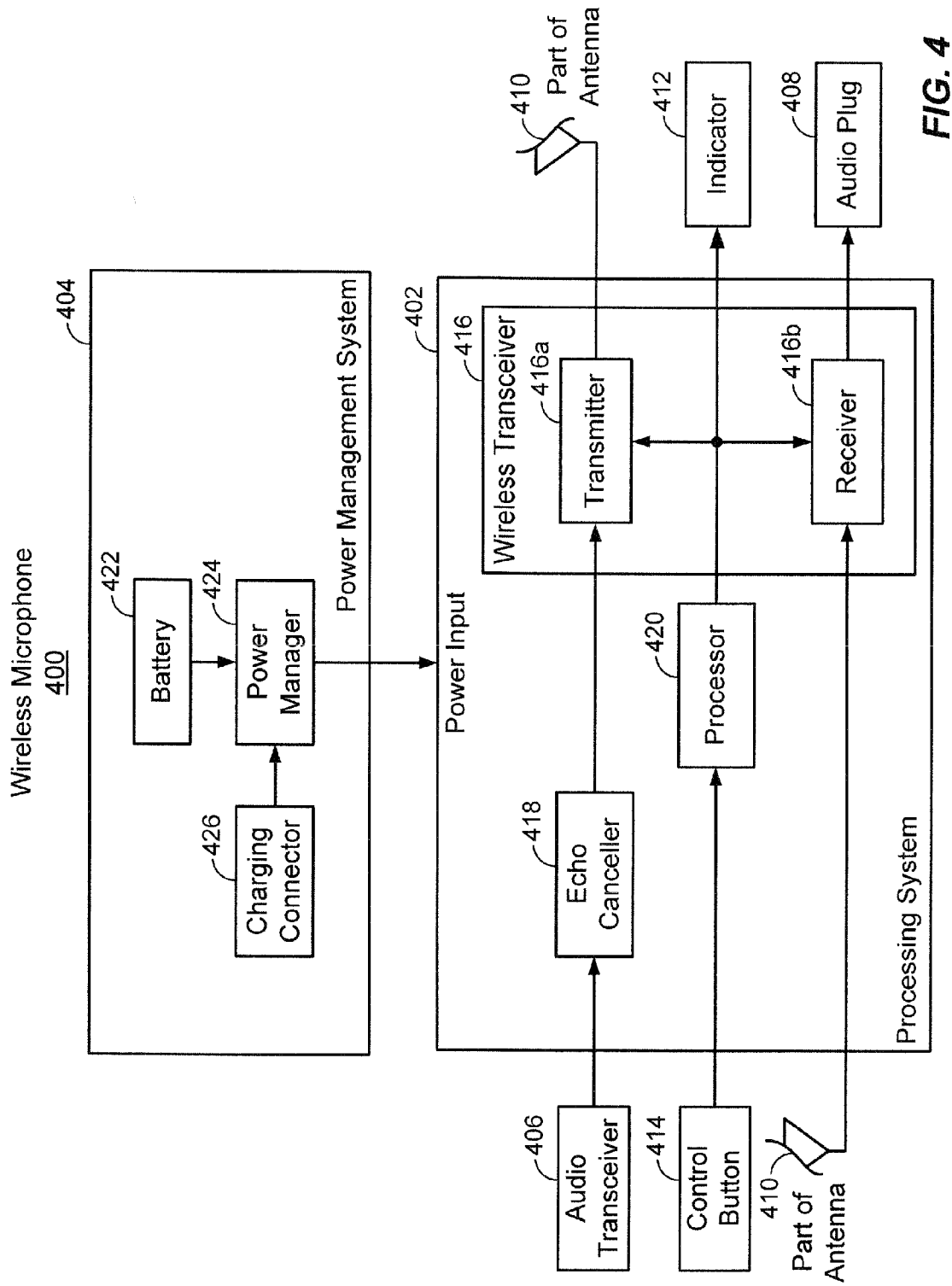
FIG. 4 is a schematic block diagram illustrating an example of a wireless microphone.

FIG. 4 is a schematic block diagram illustrating an exemplary embodiment of a wireless microphone 400. The wireless microphone 400 is shown with a processing system 402, a power management system 404, and various interfaces including an audio transducer 406, an audio plug 408, an antenna 410, an indicator 412, and a control button 414.

The audio transducer 406 may be positioned under the microphone cover 206 (see FIG. 2) to pick up the occupant's voice in the vehicle and convert it to an electrical signal for processing by the processing system 402. The processed voice from the audio transducer 406 may then be provided to the antenna 410 for transmission to a mobile telephone 102 (see FIG. 1). The antenna 410 may also be used for coupling a voice transmission from the mobile telephone and an audio transmission from a digital audio player 104 (see FIG. 1) to the processing system 402 for processing. The processed voice from the mobile telephone, or the processed audio from the digital audio player, may then be provided to the vehicle's audio system via the audio plug 408 for playback on the speakers 110 (see FIG. 1). The control button 414 may be used by the occupant of the vehicle to control the wireless microphone 400. It provides a means for answering and terminating an incoming call to the mobile telephone. By way of example, the occupant may press the control button 414 located on the housing 202 (see FIG. 2) of the wireless microphone 400 to answer or terminate a call on the mobile telephone. The indicator 412 may be used to provide an indication to the occupant that the wireless microphone 400 is operational.

The processing system 402 is shown with a wireless transceiver 416 that includes both a transmitter 416a and receiver 416b. The transmitter 416a converts and modulates voice from the audio transducer 406 into a format suitable for transmission to the mobile telephone 102 (see FIG. 1). The receiver 416b demodulates the voice and audio from the mobile telephone 102 and digital audio player 104, respectively, and converts it into a suitable format for the audio input of the vehicle's audio system (see FIG. 1). The wireless transceiver 416 performs this functionality by implementing the various protocols required by the particular wireless standard employed by the wireless microphone 400. By way of example, a Bluetooth wireless transceiver may be implemented using Bluetooth core protocols to implement various RF functions, baseband protocols, and low level link functions. These core protocols support any number of Bluetooth profiles. In this example, an Advanced Audio Distribution Profile (A2DP) profile may be used to support high quality audio and voice streaming between the wireless microphone 400 and other devices (e.g., the mobile telephone and the digital audio player) over a Bluetooth connection.

The processing system 402 is also shown with an echo canceller 418 between the audio transducer 406 and the transmitter 416a in the wireless transceiver 416. The echo canceller 418 is configured to remove the echo produced by the speakers 110 that enters the wireless microphone 400 through the audio transducer 406. By cancelling this echo, the voice quality of the telephone call is improved by removing the echo that might otherwise be heard by the far end participant.

The processing system 402 is also shown with a processor 420. The processor 420 may be used to control various functions in the wireless microphone 400. In one exemplary embodiment of a processing system 402, the processor 420 controls the multiplexing function of the receiver 416*b* between the voice from the mobile telephone 102 and the audio from the digital audio player 104 (see FIG. 1). By way of example, the processor 420 may be configured to provide audio from the receiver 416*b* to the audio plug 406 for playback through the speakers 110 (see FIG. 1) when the mobile telephone 102 is not in use. When the occupant of the vehicle initiates or receives a call on the mobile telephone 102, the processor 420 may be further configured to mute any audio received by the receiver 416*b* and provide voice from the mobile telephone 102 to the audio plug 406 so that the occupant in the vehicle can hear the far end participant's voice through the speakers 110 on the vehicle's audio system. The multiplexing function may be performed by the processor 420 automatically or manually via the control button 414 on the housing 202 (see FIG. 2) of the wireless microphone 400. In the latter case, the control button 414 provides a means to switch the receiver between the audio stream from the digital audio player and the voice stream from the mobile telephone. The control button 414 may be depressed by the vehicle's occupant to answer a call on the mobile telephone 102. In response, the processor 420 controls the receiver 416*b* to multiplex the voice from the mobile telephone 102 to the audio plug 406. Once the vehicle's occupant is engaged in a call, the control button 414 may be depressed to end the call, thereby causing the processor 420 to control the receiver 416*b* to multiplex the audio from the digital audio player 104 to the audio plug. In an alternative exemplary embodiment of the processing system 402, the processor 420 may be configured to perform other functions in response to the activation of the control button 414 by the vehicle's occupant or the activation of other buttons on the wireless device, mobile telephone, digital audio player, vehicle's audio system, or elsewhere in the vehicle.

The processor 420 may also be used to provide an indication to the vehicle's occupant that the wireless microphone 400 is operational. This may be accomplished with the indicator 412 connected to the processor 420. In one exemplary embodiment of the wireless microphone 400, the indicator 412 includes a light diffuser 209 positioned between the housing 202 and the microphone cover 206, an LED (not shown) positioned within the housing 202 to emit light through the light diffuser 209, and associated LED driver circuitry (not shown). In this example, the indicator 412 may be controlled by the processor 420 to provide a flashing light indicator when the wireless microphone 400 has a wireless connection with another device, however, other indicator formats may be used.

The power management system 404 is shown with a battery 422. The use of low power short range wireless technology, such as Bluetooth, in conjunction with power management enables a small size battery that fits within a wireless microphone to power the electronics for an extended period of time, thereby allowing ease of use by the vehicle's occupant by simply plugging the device into the audio auxiliary input jack 108 (see FIG. 1) of the vehicle's audio system without having to connect and wires or cables. The wireless microphone allows the vehicle occupant, or user of the device, to take it with him or her when he or she travels.

The power management system 404 is also shown with a power manager 424. The power manager 124 provides a means for managing the power provided by the battery 422 to the wireless microphone. The power manager 424 may be used to regulate the voltage applied to the battery 422 through a charging connector 426 when the battery 422 is being recharged. The power manager 424 may also be used to regulate the voltage output from the battery 422 and distribute the regulated voltage to the processing system 402, the audio transducer 406, the control button 414, the indicator 412, and any other components that require power. Preferably, the power manager 424 provides one or more low power modes to reduced power consumption by the processing system 402 when the wireless microphone 400 is not receiving a transmitting voice during a call on the mobile telephone 102 or receiving audio from a digital audio player 104 (see FIG. 1).

The exemplary embodiments of the wireless microphone 400 are described in connection with FIG. 4 with multiple elements that form the processing system 402. The power management system 404, and the various interfaces, all interconnected to provide the functionality presented throughout this disclosure. These elements are shown as separate entities for clarity of presentation. However, as those skilled in the art will readily appreciate, any one of these elements may be (i) a single entity, as shown, (ii) multiple entities, (iii) combined with one or more other elements into either a single entity or multiple entities, or (iv) configured in any other suitable manner. By way of example, the transceiver 416, which is shown as a single element, may be implemented with a separate transmitter and receiver. As another example, the functionality of the transceiver 416 described earlier may be distributed across the transceiver 416 and the processor 418. By way of example, some or all of the Bluetooth profiles may be implemented by the processor 418. In one exemplary embodiment, the entire processing system 402 may be combined into a single entity, either alone or together with all or part of the power management system 422. The single entity may be a implemented as a "System on a Chip" (SoC), with an application specific integrated circuit (ASIC) for example, or by some other means. The precise manner in which elements are implemented will depend upon the particular application and overall design constraints imposed on the system.

These elements, whether implemented alone or in combination with one or more other elements, may be implemented with electronic hardware, computer software, or any combination thereof. By way of example, an element, any portion of an element, or any combinations of elements may be implemented with a microprocessor, microcontroller, digital signal processor (DSP), a field programmable gate array (FPGA), a programmable logic device (PLD), a state machine, gated logic, discrete hardware circuits, or other suitable processing entity configured to perform the various functions described throughout this disclosure. An element, any portion of an element, or any combination of elements presented in this disclosure may include software executable by a microprocessor, microcontroller, DSP, or any other suitable platform. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various embodiments presented throughout this disclosure, the memory may be internal to the processors (e.g., cache or register). Those skilled in the art will recognize how best to implement the described functionality presented throughout this disclosure depending on the particular application and the overall design constraints imposed on the overall system.

Figure 5:
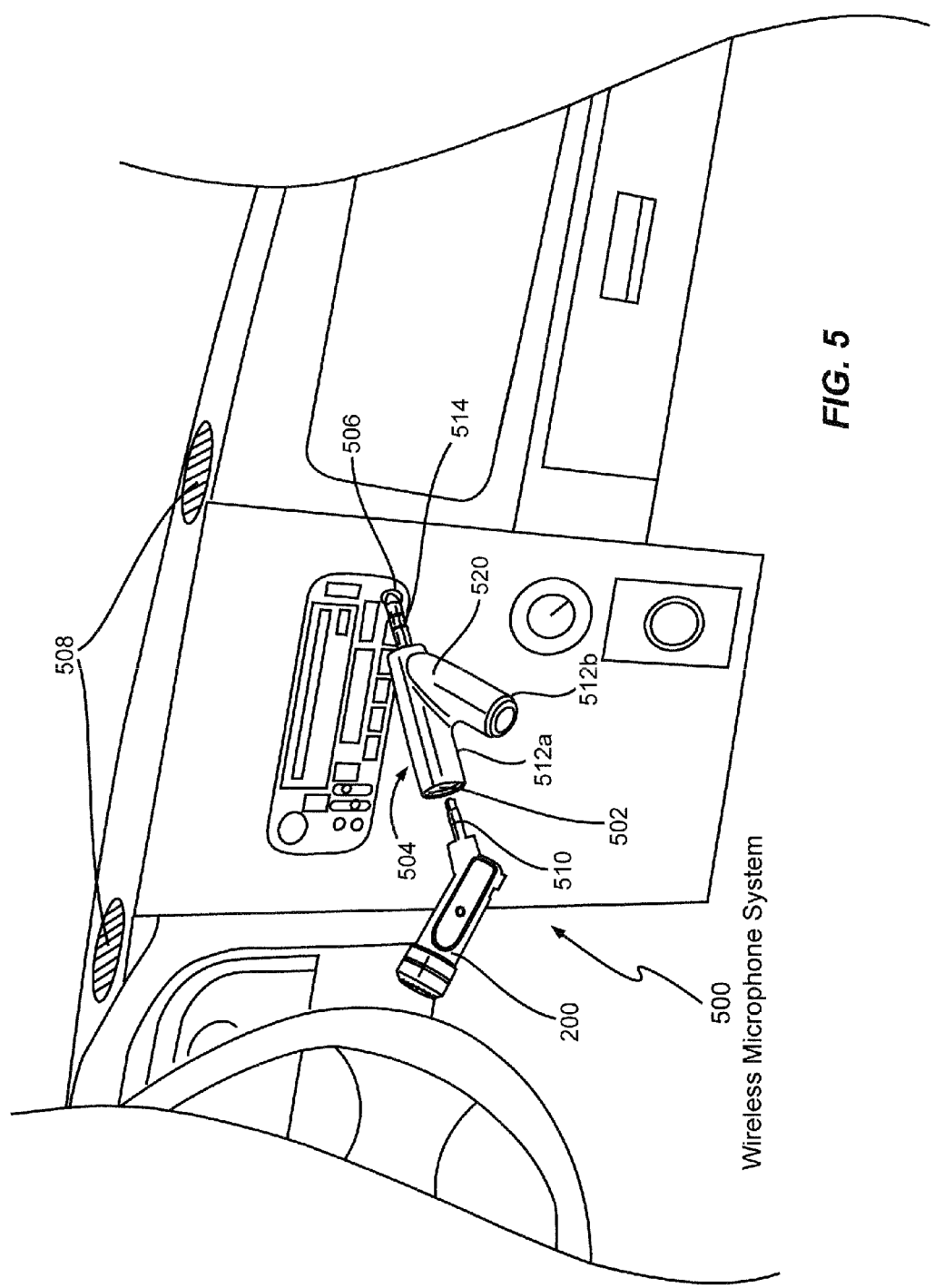
FIG. 5 is a perspective view illustrating an example of a wireless microphone system.

Another exemplary embodiment of the present invention will now be presented with reference to FIG. 5. In this exemplary embodiment, a wireless microphone system 500 includes a wireless microphone 502 and an audio adapter 504. The audio adapter 504 is configured to allow an occupant of the vehicle to easily select one of several audio sources to connect to the vehicle's speakers 508 through the vehicle's audio unit 506. The wireless microphone 502 presented earlier in this disclosure is one example of an audio source suitable to be received by the audio adapter 504. This wireless microphone 502 includes an audio plug 510 that plugs into a first audio input jack 512a. Another audio source may be connected to the audio adapter 504 through a cable (not shown) having an audio plug that plugs into a second audio input jack 512b. The second audio source may be a satellite radio, a DVD player, an HD radio receiver, a digital audio player (e.g., MP3 player), or some other suitable audio source. An audio output plug 514 extending from the audio adapter 504 may be plugged into the vehicle's audio system.

The audio adapter 504 is shown having a substantially "Y" shaped configuration, but may have other configurations depending upon the particular design preferences of the skilled artisan. This configuration is implemented with a housing 520 having a tubular section at a proximate end of the housing 520 which splits into two tubular sections. The distal end of the first tubular section supports the first audio input jack 512a and the distal end of the second tubular section supports the second audio input jack 512b. The audio adapter 504 may be formed with a hard elastomeric, such as TPU, or some other suitable material. This configuration is a rigid and lightweight design that can that can support itself, and the wireless microphone 502, when plugged into the vehicle's audio system.

Figure 6:
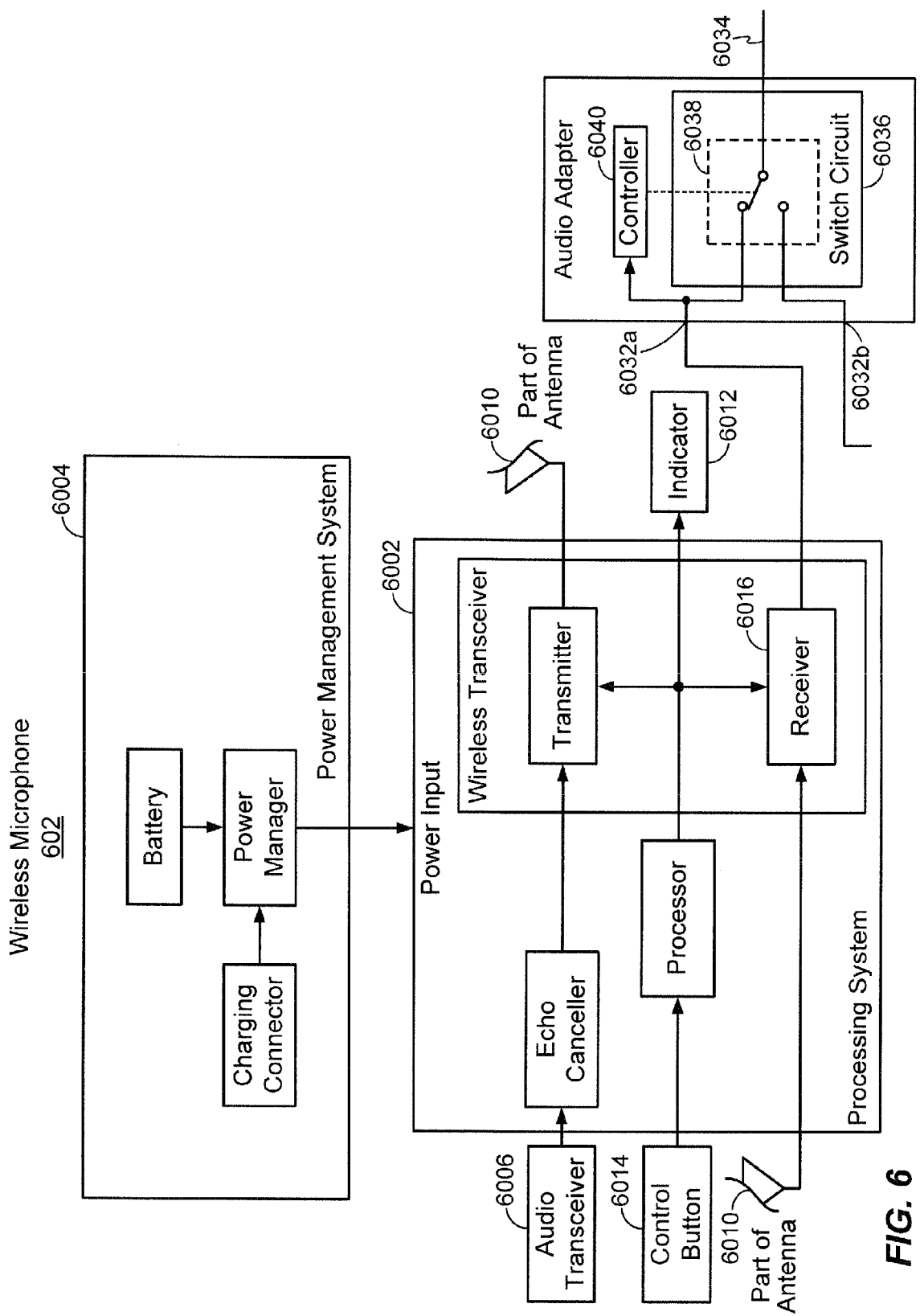
FIG. 6 is a schematic block diagram illustrating an example of the wireless microphone system.

FIG. 6 is a schematic block diagram illustrating the exemplary embodiment of the wireless microphone system 500. The wireless microphone 602 is shown with a processing system 6002, a power management system 6004, and various interfaces including an audio transducer 6006, an audio plug 6008, an antenna 6010, an indicator 6012, and a control button 6014, which function in the same manner as described in detail earlier in this disclosure. The audio adapter 604 is shown with a switch circuit 6036 that provides a means for the occupant of the vehicle to switch the connection between the two audio input jacks 6032a, 6032b to the audio output plug 6034. The switch circuit 6036 is shown as a mechanical switch 6038 for illustrative purposes, but may also be implemented as an electrical switch. The switch 6038 provides a means for providing a signal from the wireless microphone 602 through the audio plug 6008 to switch the electrical connection. The position of the switch 6038 is controlled by a controller 6040. An example of a mechanical switch is a relay. Examples of an electrical switch includes a parallel arrangement of field effect transistors (FETs) controlled by the controller 6040, an audio multiplexer, and the like. The specific design of the switch circuit 6036 for any particular application is well within the capabilities of one skilled in the art.

In one exemplary embodiment of the wireless microphone system 600, the input to the controller 6040 is provided from the wireless microphone 602 through the audio plug 6008. Various 3.5 mm audio plugs that can provide a stereo audio signal, a control signal, and power are well known in the art. In this example, the control button 6014 on the wireless microphone 602 may be used by the vehicle's occupant to control the switching function of the audio adapter 604. The processor 6018 generates an audio adapter control signal that can be toggled by depressing the control button 6014. The audio adapter control signal generated by the processor 6018 may be provided to the wireless receiver 6016. The wireless receiver 6016 provides the audio adapter control signal, power, and the appropriate audio or voice signal from either the digital audio player or the mobile telephone, respectively, to the audio adapter 604 through the audio plug 6008 at the output of the wireless microphone 602.

Figure 7A:
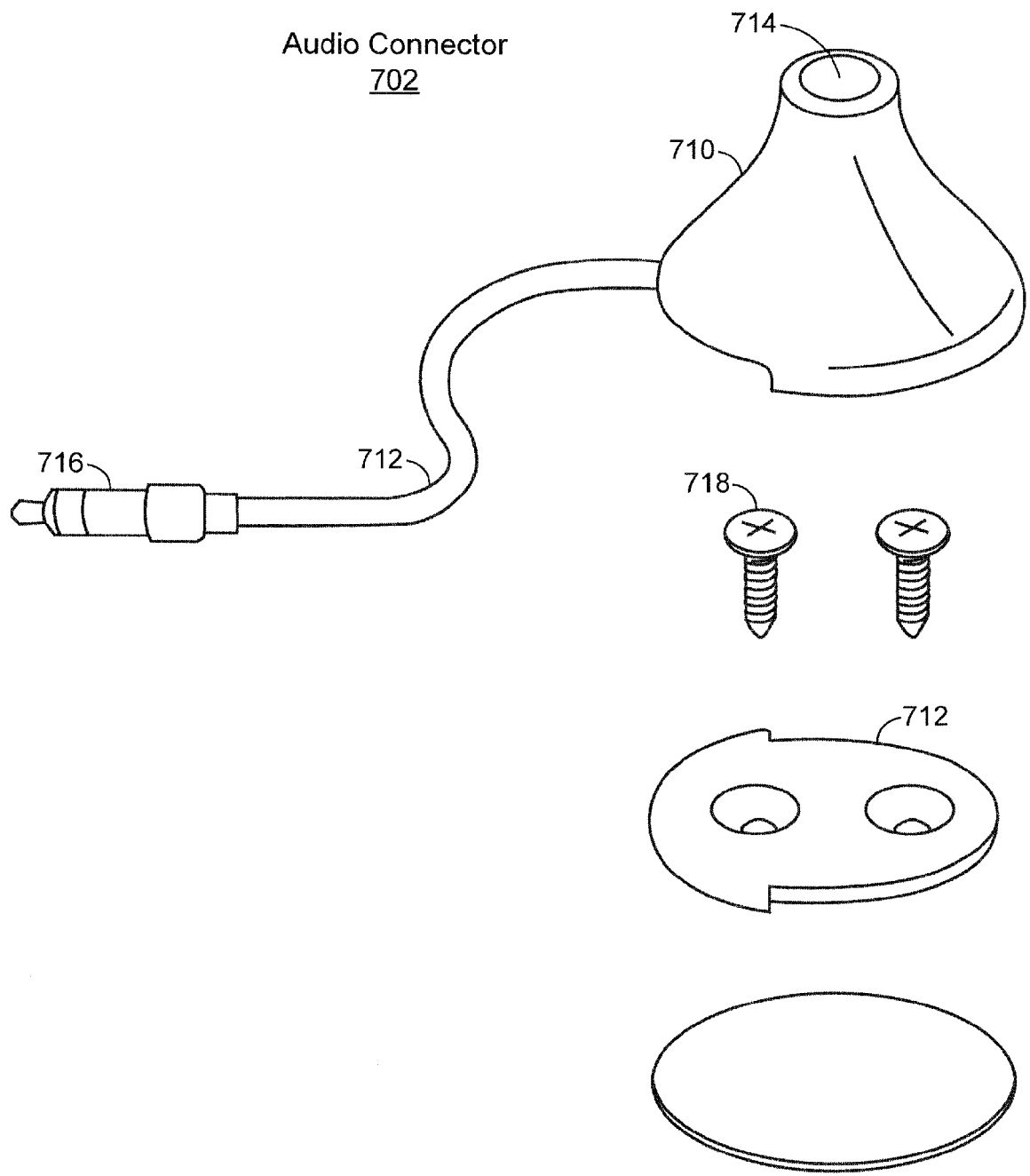
FIG. 7A is a perspective view illustrating an example of an audio connector for a vehicle.
Figure 7B:
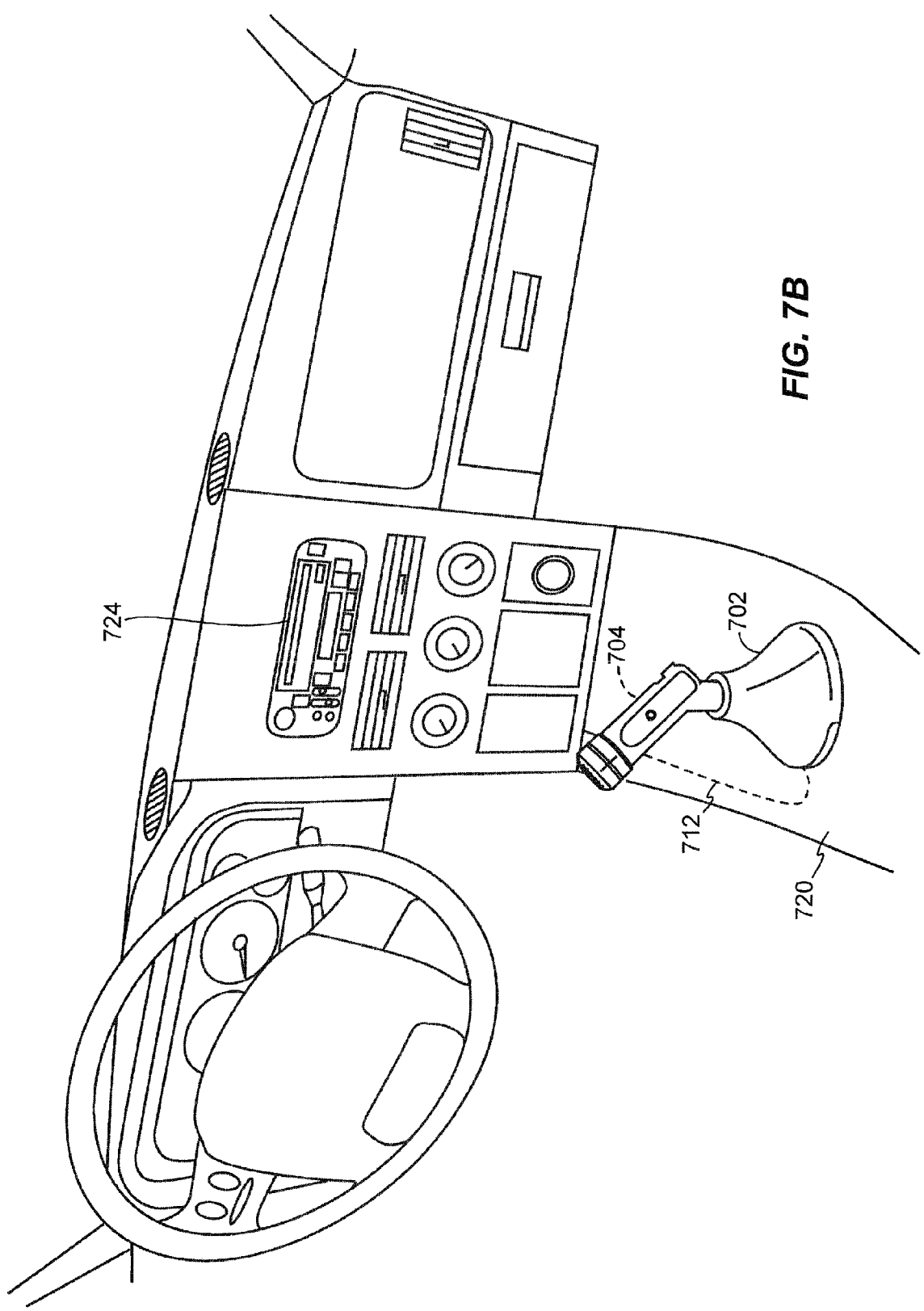
FIG. 7B is a perspective view illustrating an example of a wireless microphone system using an audio connector.

Another exemplary embodiment of the present invention will now be presented with reference to FIGS. 7A and 7B. FIG. 7A is a perspective view illustrating an example of an audio connector 702 for a vehicle, and FIG. 7B is a perspective view illustrating an example of a wireless microphone system 700 using the audio connector 702 to electrically couple a wireless microphone 704 to the auxiliary input 706 of the vehicle's audio unit 708.

The audio connector 702 includes a body 710 and a base 712. The body 710 is shown with a conical shape, but may have other shapes depending upon the design preferences of the skilled artisan. The audio connector 702 includes an audio jack 714 located at the top of the body 710. An electrical cable extending from the body 710 of the audio connector 702 is shown with an audio plug 716 at its distal end, thereby electrically coupling the jack 714 to the plug 716. The base 712 provides a means for mounting the body 710 to the interior of the vehicle. The base 712 may be attached to the interior of the vehicle with one or more connectors. By way of example, two screws 718 may be used to attach the base 712 to the vehicle. In the described embodiment, the body 710 has a removable connection to the base 712. In this example, a twist and lock connection is show, but other types of removable or permanent connections may be used.

The audio connector 702 is shown mounted to the center console 720 of the vehicle, but may be mounted elsewhere in the vehicle depending on the specific configuration of the connector and the vehicle. In the embodiment shown, the electrical cable 712 extending from the audio connector 702 may be routed under the vehicle's dash to the an auxiliary input at the rear of the vehicle's audio unit 724, but the cable 712 may be used to connect the audio connector 702 to the vehicle's audio system located anywhere within the vehicle in other embodiments of the present invention. The audio connector 702 may be mounted to the center console 720, and the cable 712 connected to the vehicle's audio system during factory installation, or later by an installer of an after-market wireless microphone system 700. The wireless microphone 704 may be plugged into the audio connector 702 by the occupant of the vehicle to support mobile telephone communications and/or audio streaming from a digital audio player. When not in use, the wireless microphone 702 may be left plugged into the audio connector 702 or removed by the occupant of the vehicle.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless microphone for vehicles, comprising:
   a housing having a body portion and an integrated rigidly affixed tail portion;
   an audio plug rigidly disposed in the tail portion, and extending from the tail portion;
   a wireless transmitter within the housing;
   a transducer within the housing, the transducer being electrically connected to the transmitter; and
   a wireless receiver within the housing, the receiver being electrically connected to the audio plug;
   wherein the audio plug is configured to plug into an auxiliary input on a vehicle audio unit and thereby rigidly support the microphone in the auxiliary input on the vehicle audio unit.

2. The wireless microphone of claim 1 wherein the housing comprising a tubular member and a microphone cover connected to the tubular member.

3. The wireless microphone of claim 2 wherein the plug extends from one end of the tubular member and the microphone cover is at the other end of the tubular member.

4. The wireless microphone of claim 3 wherein the cross-section area of the body portion is greater than the cross-section area of the tail portion.

5. The wireless microphone of claim 3 wherein the tubular member comprises a head portion connected to the microphone cover, a tail portion having the plug extending therefrom, and a body portion extending between the head portion and the tail portion, wherein the cross-section area of the head portion is greater than the cross-section area of the body portion.

6. The wireless microphone of claim 3 wherein the tubular member comprises a head portion connected to the microphone cover, a tail portion having the plug extending therefrom, and a body portion extending between the head portion and the tail portion, wherein the tail portion extends from the body portion at an obtuse angle relative to the axis of the body portion.

7. The wireless microphone of claim 3 wherein the tubular member comprises a head portion connected to the microphone cover, a tail portion having the plug extending therefrom, and a body portion extending between the head portion and the tail portion, wherein one or more of the head, body and tail portions are substantially cylindrical.

8. The wireless microphone of claim 2 wherein the plug extends from one end of the tubular member, the tubular member comprising a hub at said one end to support the plug.

9. The wireless microphone of claim 2 wherein the transducer is positioned within the housing relative to the microphone cover so that the transducer can pick up voice from a user.

10. The wireless microphone of claim 9 wherein each of the transmitter and receiver is positioned within the housing between the transducer and the plug.

11. The wireless microphone of claim 2 further comprising a light diffuser positioned between the microphone cover and the tubular member.

12. The wireless microphone of claim 1 wherein the housing comprises an axial length that is less than 7.0 cm.

13. The wireless microphone of claim 1 wherein the plug is a 3.5 mm audio plug.

14. The wireless microphone of claim 1 further comprising an echo canceller electrically connected between the transducer and the transmitter.

15. The wireless microphone of claim 14 wherein the echo canceller is configured to remove echo produced by one or more speakers connected to the audio unit.

16. The wireless microphone of claim 1 further comprising a battery to power the wireless microphone.

17. The wireless microphone of claim 16 further comprising a charging connector accessible through the housing for charging the battery through an external power source.

18. The wireless microphone of claim 16 further comprising means for managing the power provided by the battery to the wireless microphone.

19. The wireless microphone of claim 1 wherein the wireless receiver is configured to stream audio from a wireless digital audio player to the audio unit when the plug is plugged into the auxiliary input on the audio unit.

20. The wireless microphone of claim 1 wherein the transmitter is configured to stream voice from a user via the transducer to a mobile telephone, and the receiver is configured to stream voice from the mobile telephone to the audio unit when the plug is plugged into the auxiliary input on the audio unit.

21. The wireless microphone of claim 20 further comprising means for answering and terminating an incoming call to the mobile telephone.

22. The wireless microphone of claim 20 wherein the wireless receiver is further configured to stream audio from a wireless digital audio player to the audio unit when the plug is plugged into the auxiliary input on the audio unit, the wireless microphone further comprising means to switch the receiver between the audio stream from the digital audio player and the voice stream from the mobile telephone.

23. A wireless microphone system for vehicles, comprising:
   an audio adapter having first and second audio jacks and a first audio plug configured to plug into an auxiliary input on a vehicle audio unit and thereby mechanically rigidly support the audio adapter in the auxiliary input on the vehicle audio unit, the first audio plug having a switchable electrical connection between the first and second audio jacks; and
   a wireless microphone comprising:
      a housing having a body and an integrated rigidly affixed tail,
      a second audio plug rigidly disposed in the tail portion, and extending from the tail portion,
      a wireless transmitter within the housing,
      a transducer within the housing, the transducer being electrically coupled to the transmitter, and
      a wireless receiver within the housing, the receiver being electrically coupled to the second audio plug;

wherein the audio second plug is configured to plug into the first audio jack and thereby rigidly support the microphone in the audio adapter.

24. The wireless microphone system of claim 23 wherein the housing further comprises a tubular section at said one end of the housing which splits into two tubular sections, a first one of the two tubular sections terminating at the first jack and a second one of the two tubular sections terminating at the second jack.

25. The wireless microphone system of claim 23 wherein the wireless microphone further comprises means for switching the electrical connection of the first plug between the first and second jacks.

26. The wireless microphone system of claim 25 wherein the means for switching the electrical connection comprises means for providing a signal from the wireless microphone through the second plug to switch the electrical connection.

27. The wireless microphone system of claim 26 wherein the means for providing a signal comprises a switch on the housing.

28. A wireless microphone system for vehicles, comprising:
an audio connector having an audio jack, a first audio plug, and an audio cable electrically connecting the audio jack and first audio plug, wherein the audio jack is mounted in the interior of the vehicle and accessible to a user, and wherein the audio cable enables the first audio plug to plug into an auxiliary input on a vehicle's audio unit; and
wireless microphone comprising:
 a housing having a body and a rigidly affixed tail,
 a second audio plug rigidly disposed in the tail portion, and extending from the tail portion,
 a wireless transmitter within the housing,
 a transducer within the housing, the transducer being electrically coupled to the transmitter, and
 a wireless receiver within the housing, the receiver being electrically coupled to the second audio plug;
wherein the second audio plug is plugged into the audio jack, thereby rigidly supporting the microphone in the audio connector.

29. The wireless microphone system of claim 28 wherein the first plug is plugged into the auxiliary input on the rear of the vehicle's audio unit.

30. The wireless microphone system of claim 28 wherein the audio connector further comprises a body having the jack, wherein the body is mounted in the interior of the vehicle.

31. The wireless microphone system of claim 30 wherein the body is mounted to the center console.

32. The wireless microphone system of claim 30 wherein the audio connector further comprises a base for mounting the body to the interior of the vehicle.

33. The wireless microphone system of claim 32 further comprising one or more connectors for attaching the base to the interior of the vehicle.

34. The wireless microphone system of claim 32 wherein the body has a removable connection with the base.

35. The wireless microphone system of claim 30 wherein the body comprises one end for mounting in the interior of the vehicle and another end having the jack.

36. The wireless microphone system of claim 35 wherein the ends of the body are circular.

37. The wireless microphone system of claim 36 wherein the diameter of said one end of the body is greater than the diameter of said another end of the body.

38. The wireless microphone system of claim 30 wherein the body has a conical shape.

\* \* \* \* \*